United States Patent
Iijima

(10) Patent No.: US 6,340,654 B1
(45) Date of Patent: Jan. 22, 2002

(54) FRESHNESS-RETAINING AGENT AND METHOD FOR AGRICULTURAL/HORTICULTURAL PRODUCTS

(75) Inventor: Yoshihiko Iijima, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/657,904

(22) Filed: Sep. 8, 2000

(30) Foreign Application Priority Data

Sep. 10, 1999 (JP) ............................................ 11-257261
Sep. 10, 1999 (JP) ............................................ 11-257262

(51) Int. Cl.$^7$ ........................... A01N 3/02; A23B 7/144; A23B 7/153
(52) U.S. Cl. ....................... 504/114; 426/312; 426/562; 426/477
(58) Field of Search ......................................... 504/114

(56) References Cited

U.S. PATENT DOCUMENTS 5,489,399 A * 2/1996 Koyakumaru et al. ...... 252/373
6,083,535 A * 7/2000 Chiba et al. ................ 424/489

OTHER PUBLICATIONS

Derwent Abstract 1975–70687W of BE 827599A, published Oct. 1975.*

* cited by examiner

Primary Examiner—S. Mark Clardy
(74) Attorney, Agent, or Firm—Oblon, Spivak, McClelland, Maier & Neustadt, P.C.

(57) ABSTRACT

A freshness-retaining agent for an agricultural or horticultural product comprises an organic acid and a hydrgencarbonate. The organic acid may preferably be an organic acid which in the presence of water given off from the agricultural or horticultural product, reacts with the hydrogencarbonate such that carbon dioxide gas is gradually generated, for example, cinnamic acid, benzoic acid or citric acid or a derivative thereof. The hydrgencarbonate may preferably be sodium hydrogencarbonate. The freshness of the agricultural or horticultural product can be retained by causing the freshness-retaining agent to exist in the same atmosphere as the agricultural or horticultural product such that the freshness-retaining agent is allowed to gradually generate carbon dioxide gas in the presence of water given off from the agricultural or horticultural product.

12 Claims, No Drawings

FRESHNESS-RETAINING AGENT AND METHOD FOR AGRICULTURAL/HORTICULTURAL PRODUCTS

BACKGROUND OF THE INVENTION a) Field of the Invention

This invention relates to a freshness-retaining agent and method for agricultural products or horticultural products (hereinafter simply called "agricultural/horticultural products"). More specifically, the present invention is concerned with a high-safety, freshness-retaining agent for agricultural/horticultural products, which can effectively and persistently delay autogeneous deteriorations, such as discoloration and softening, of the agricultural/horticultural products, said deteriorations taking place during transportation or storage, to improve their storability, and is also effective for preventing quality deteriorations of the agricultural/horticultural products by staining microorganisms. The present invention is also concerned with a freshness-retaining method for agricultural/horticultural products, which makes use of the freshness-retaining agent.

b) Description of the Related Art

Freshness-retaining technology for agricultural/horticultural products, such as vegetables, fruits, flowers and ornamental plants, has been studied in various ways for many years from the need to improve the efficiency of their supply to the market, and these studies have led, for example, to the development of low-temperature storage, CA (controlled atmosphere) storage making combined use of control of a gas concentration and cold storage, package storage relying upon films, and the like.

However, the former two methods can hardly be adapted in many instances for an economical reason that costs for storage would increase, and are not considered to be practical methods yet. On the other hand, the package storage making use of a film has been developed in an attempt to easily achieve the effect of CA but, different from real CA storage, relies only upon the gas permeability of the film itself and does not warrant any extravagant expectation.

As a method for retaining the freshness of an agricultural/horticultural product at relatively low cost, it may be contemplated to use one or more of various freshness-retaining agents. Fundamentally speaking, elimination of ethylene, which is considered to be a cause for a freshness deterioration of an agricultural/horticultural product, is regarded as being most effective for the retention of the freshness of the agricultural/horticultural product. Accordingly, most of conventional freshness-retaining agents are intended to eliminate ethylene. They are, however, insufficient in many instances to achieve the retention of freshness of agricultural/horticultural products under a broader range of conditions. To achieve safe and absolutely effective retention of the freshness of agricultural/horticultural products, there is a need for a freshness-retaining agent which has not only mere ethylene-eliminating ability but also ability to safely and effectively control staining microorganisms, which would otherwise cause deteriorations in the quality of the agricultural/horticultural products.

Freshness-retaining agents of the relatively new type include certain freshness-retaining agents which generate carbon dioxide gas that competitively inhibits the action of ethylene, and effects of such freshness-retaining agents are attracting interests. These freshness-retaining agents, which generate carbon dioxide, have a characteristic feature in that they make use of the carbon dioxide generation mechanism of bath preparations. Described specifically, a carbonate or a hydrogencarbonate is mixed with an acid to generate carbon dioxide, thereby increasing the concentration of carbon dioxide gas in a surrounding atmosphere of an agricultural/horticultural product. Since these freshness-retaining agents use, as a solid acid, a water-soluble organic acid led by fumaric acid, a reaction in which carbon dioxide gas is generated takes place abruptly and subsides shortly. They are hence accompanied by a drawback that the freshness-retaining effect for the agricultural/horticultural products does not last long.

SUMMARY OF THE INVENTION

An object of the present invention is, therefore, to overcome the above-described drawbacks, and to provide a safe and reliable freshness-retaining agent which, while persistently giving off carbon dioxide little by little to suppress the concentration of ethylene in a surrounding atmosphere of an agricultural/horticultural product, effectively exhibits greenishness-retaining activity and antibacterial activity for the agricultural/horticultural product and hence achieves continuous retention of the overall freshness of the agricultural/horticultural product.

To achieve the above-described object, the present inventors have proceeded with extensive research. As a result, it has been found that use of a mixture of an organic acid and a hydrogencarbonate as a freshness-retaining agent makes it possible to solve the above-described problems of the conventional art, leading to the completion of the present invention.

In one aspect of the present invention, there is thus provided a freshness-retaining agent for an agricultural or horticultural product, which comprises an organic acid and a hydrogencarbonate. In another aspect of the present invention, there is also provided a freshness-retaining method for an agricultural or horticultural product, which comprises using the freshness-retaining agent.

The freshness-retaining agent according to the present invention can show excellent ability to lower the concentration of ethylene while having high safety. On the other hand, the freshness-retaining method according to the present invention has high safety and can retain the freshness of an agricultural/horticultural product over an extended time.

DETAILED DESCRIPTION OF THE INVENTION AND PREFERRED EMBODIMENTS

The present invention will next be described in further detail based on preferred embodiments.

Methods effective for the retention of the freshness of an agricultural/horticultural product can include firstly to maintain the concentration of ethylene low in a surrounding atmosphere of the agricultural/horticultural product, secondly to take a preventive measure against staining microorganisms of the agricultural/horticultural product, and thirdly to retain the greenishness of the agricultural/horticultural product.

As a deterioration in the freshness of an agricultural/horticultural product is considered to be caused by ethylene given off from the agricultural/horticultural product itself, delaying of the deterioration in the freshness of the agricultural/horticultural product requires to maintain the concentration of ethylene low in the surrounding atmosphere of the agricultural/horticultural product by a certain method. Further, the occurrence of staining microorganisms and a reduction in greenishness, both of which take place along with a deterioration in the freshness of the agricultural/ horticultural product, significantly lower the commercial value of the agricultural/horticultural product.

With the foregoing in view, the present inventors have proceeded with an investigation on various compounds. As a result, it has been found that in the presence of water given off from an agricultural/horticultural product, an organic acid gradually reacts with a hydrogencarbonate and releases carbon dioxide gas little by little over a long time. This persistent generation of carbon dioxide gas can suppress the concentration of ethylene in the surrounding atmosphere of the agricultural/horticultural product, and owing to antibacterial and anti-mold activities which the organic acid itself possesses, occurrence-preventing effect against staining microorganisms of the agricultural/horticultural product is also exhibited.

The generation of carbon dioxide gas from the freshness-retaining agent according to the present invention basically makes use of a reaction in which carbon dioxide is generated from an organic acid and a hydrogencarbonate in a water system. According to the present invention, a mixture of an organic acid and a hydrogencarbonate is caused to concurrently exist in a surrounding atmosphere of an agricultural/horticultural product, whereby water vapor evaporated from the agricultural/horticultural product or its dew is brought into contact with the mixture, and by such water, carbon dioxide gas occurs gradually.

For an agricultural/horticultural product, carbon dioxide is known to generally show an action opposite to the action of ethylene. Because carbon dioxide gas acts to reduce breathing of an agricultural/horticultural product and ethylene and carbon dioxide gas resemble with each other in chemical structure, carbon dioxide is considered to competitively inhibit, as an analog of ethylene, the action of ethylene. Whatever the mechanism is, carbon dioxide gas can suppress the action of ethylene. Storage of a harvested agricultural/horticultural product in carbon dioxide gas, therefore, makes it possible to prolong its storage time.

Accordingly, the freshness-retaining property of the freshness-retaining agent according to the present invention is presumed to be expressed in accordance with a mechanism to be described hereinafter. Namely, an addition of water, which has evaporated from the agricultural/ horticultural product, to the freshness-retaining agent according to the present invention results in gradual occurrence of carbon dioxide gas, and this carbon dioxide gas suppresses the occurrence of ethylene.

As a preferred organic acid for use in the present invention, cinnamic acid (phenylpropenic acid) or a derivative thereof can be mentioned. Vapor of cinnamic acid or a derivative thereof itself also inhibits activity of an ethylene-forming enzyme, and suppresses occurrence of ethylene. Owing to the above-described dual action, the concentration of ethylene in the atmosphere in which the freshness-retaining agent according to the present invention exists is considered to be effectively lowered. Cinnamic acid or a derivative thereof, owing to its antibacterial effect, can also reduce a deterioration in the quality of the agricultural/ horticultural product, which deterioration would take place as a result of staining by molds or bacteria. These ethylene concentration lowering effect and antibacterial effect are considered to be combined to exhibit marked freshness-retaining property.

The term "cinnamic acid or a derivative thereof" as used herein is a general name for compounds, which have a structure that one of the two hydrogen atoms of the carbon atom at the 3-position of propenoic acid (or acrylic acid) has been substituted by a phenyl group which may contain one or two substituent groups. Namely, these compounds are represented by the following formula (1):

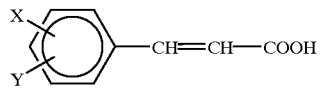

(1)

wherein X and Y are hydrogen atoms or substituent groups such as hydroxyl and methoxy groups, and X and Y may the same or different.

Cinnamic acid or a derivative thereof, which is for use in the present invention, may preferably be one having by itself antibacterial and anti-mold effect and ethylene concentration lowering effect. Specific examples can include ferulic acid, caffeic acid, sinapic acid, and p-coumalic acid. They can be used either singly or in combination. Cinnamic acid which is a food additive is particularly preferred for its strong antibacterial effect.

Cinnamic acid has inhibitory effect against molds and bacteria as disclosed in JP 5-117125, JP 9-154482, etc. and in addition, has ethylene concentration lowering effect as disclosed in JP 9-154482, JP 10-117680, etc. Further, as indicated in JP 10-117680, JP 10-273401, etc., it also has effect to control a deterioration of chlorophyll in an agricultural/horticultural product and to retain a fresh greenish color over an extend time.

As another preferred organic acid for use in the present invention, benzoic acid or a derivative thereof can be mentioned. Preferred as the derivative of benzoic acid is one having strong antibacterial and anti-mold effect by itself. Specified examples can include vanillic acid, syringic acid, and salicylic acid. Benzoic acid is particularly preferred in both effect and safety, because it has strong antibacterial effect and moreover, is a food additive.

As other organic acids preferred for use in the present invention, adipic acid, sorbic acid, nicotinic acid, glutamic acid, itaconic acid and undecylenic acid can be mentioned. Especially in the case of sorbic acid, nicotinic acid, itaconic acid, undecylenic acid or the like, its effects remain for a long time. Further, sorbic acid, nicotinic acid, undecylenic acid, adipic acid and the like are preferred from the standpoint of safety, because they are food additives.

As still other organic acids preferred for use in the present invention, citric acid, monosodium citrate and disodium citrate are usable. These organic acids may be used either singly or in combination. Monosodium or disodium citrate is preferred to allow the effect to last for a long time, because the carbon dioxide generating reaction takes place more quickly in the order or citric acid>monosodium citrate>disodium citrate. Further, monosodium citrate has excellent practical utility since it is available at relatively low cost and is used extensively in industry.

As still other organic acids preferred for use in the present invention, polymers with acidic groups contained therein can be mentioned. Polymers are all usable irrespective of their production processes insofar as they contain, for example, carboxyl groups, sulfonic groups, sulfate ester groups or phosphate ester groups as acidic groups. Illustrative are homopolymers of monomers having the above-described acidic groups, respectively, copolymers between these acidic-group-containing monomers and monomers copolymerizable with the acidic-group-containing monomers, polymers obtained by forming or introducing acidic groups in acidic-group-free polymers through post reactions, cellulose derivatives, and starch derivatives. No particular limitation is, however, imposed these polymers insofar they can release carbon dioxide gas by gradually reacting with the hydrogencarbonate in the presence of water.

To form or introduce acidic groups into an acidic-group-free polymer through a post reaction, the post reaction may be conducted following procedures to be described hereinafter. In the case of carboxyl groups, for example, the can be formed by hydrolyzing acid anhydride groups or ester groups such as methyl ester groups. As an alternative, carboxyl groups can also be introduced by adding a compound, which contains a mercapto group and a carboxyl group, or the like to a polymer which contains double bonds. Sulfate ester groups or phosphate ester groups can be formed by reacting a hydroxyl-containing polymer with sulfuric acid or phosphoric acid. Sulfonic groups can be introduced by sulfonation of a polymer, that is, by reacting the polymer with sulfuric acid.

Examples of polymers containing acid groups can include homopolymers of acidic-group-containing monomers, for example, unsaturated carboxylic acids such as acrylic acid, methacrylic acid, maleic acid, fumaric acid and itaconic acid, sulfonic-group-containing monomers such as ethylenesulfonic acid and styrenesulfonic acid, sulfate-ester-group-containing monomers such as hydroxyethyl methacrylate monosulfate and 2-acryloyloxyethyl acid sulfate, and phosphate-ester-group-containing monomers such as 2-acryloxyloyethyl acid phosphate; and copolymers between these acidic-group-containing monomers and monomers copolymerizable with the acidic-group-containing monomers. No particular limitation is imposed on such copolymerizable monomers.

Specific examples of acidic-group-containing polymers can include homopolymers of acrylic acid, methacrylic acid or itaconic acid; copolymers between these unsaturated carboxylic acid and at least one of acrylates, methacrylates, styrene, ethylene and the like; isobutylene-maleic anhydride alternating copolymer; carboxymethylcellulose; carboxymethyl starch; polystyrenesulfonic acid; polyhydroxyethyl methacrylate phosphate; polyhydroxyethyl methacrylate sulfate; poly(2-acryloyloxyethyl acid sulfate). Carboxyl-containing polymers are, however, preferred for their easy availability. These acid-group-containing polymers can be used either singly or in combination. No particular limitation is imposed on the content of acidic groups in such an acid-group-containing polymer, but it is preferred to contain acidic groups in a proportion of 1 milliequivalent (meq) per gram of a polymer or higher. An upper limit is in the case of a homopolymer of an unsaturated carboxylic acid.

Examples of the hydrogencarbonate for use in the present invention can include sodium hydrogencarbonate, potassium hydrogencarbonate, and ammonium hydrogencarbonate. At least one of these hydrogencarbonates is used in combination with at least one of the above-described organic acids.

No particular limitation is imposed on the form of the freshness-retaining agent according to the present invention upon using the same. However, the above-described organic acid and hydrogencarbonate may be used by formulating them into a powdery or granular form together with one or more of various additives, antibacterial agents, anti-mold agents and the like as needed or by having them borne on a suitable carrier. No particular limitation is imposed on the amount of the freshness-retaining agent according to the present invention to be used, but as a standard, it may be used in a proportion of from 0.1 to 20 parts by weight or so per 100 parts by weight of the agricultural/horticultural product although this proportion varies depending on the kind of the agricultural/horticultural product.

The mixing ratio of the organic acid to the hydrogencarbonate can be determined as desired. Nonetheless, preferred freshness-retaining effect can be exhibited when the weight ratio of the organic acid to the hydrogencarbonate is in a range of from 1:0.1 to 1:5, and marked effect is shown when their weight ratio is in a range of from 1:0.2 to 1:0.5.

To retain the freshness of an agricultural/horticultural product, it is necessary to make the agricultural/horticultural product and the freshness-retaining agent of the present invention exist together in the same atmosphere. No particular limitation is imposed on the state of coexistence of the agricultural/horticultural product and the freshness-retaining agent. For example, both of them may be placed together in a plastic bag, or the agricultural/horticultural product packed directly in corrugated fiberboard boxes and the freshness-retaining agent also packed directly in different corrugated fiberboard boxes may be placed together in a container. Whichever state of coexistence is employed, no particular limitation is imposed on the amount of the freshness-retaining agent of the present invention to be used.

When the freshness-retaining agent according to the present invention is caused to act on an agricultural/horticultural product such as vegetable, fruit, flower or ornamental plant, delaying of a deterioration in the freshness of the agricultural/horticultural product can be achieved owing to the ethylene concentration lowering effects of the organic acid and carbon dioxide gas, and the antibacterial and anti-mold property of the organic acid also acts effectively so that occurrence of staining microorganisms and offensive odor can be also suppressed. Further, use of cinnamic acid as an organic acid can also suppress a deterioration of chlorophyll in the agricultural/horticultural product, thereby making it possible to retain the fresh greenish color of the agricultural/horticultural product.

The present invention will hereinafter be described in further detail based on Examples and Comparative Examples, in which all designations of "part" or "parts" are by a weight basis unless otherwise specifically indicated.

EXAMPLE 1

In 150-mL jars with 20 g per jar of fresh pieces of apple (variety: Mutsu) placed therein, cinnamic acid (3 g), a mixture of cinnamic acid (1 g) and sodium hydrogencarbonate (2 g), ferulic acid (2 g) and sodium hydrogencarbonate (1 g), and as a comparative product, a mixture of fumaric acid (1 g) and sodium hydrogencarbonate (2 g)—all of which were individually wrapped with "KIMWIPE" (trademark for laboratory paper produced by Jujo-Kimberly Co., Ltd.)—were placed, respectively. Mouths of those jars were then hermetically closed with "PARAFILM" (trademark; product of American National Can Company). Those jars were left over at 23° C., and on DAY 1, DAY 3 and DAY 6, the concentrations of ethylene in the respective jars were measured by a tubular gas detector (manufactured by Gastec, Inc.). The concentration of ethylene in a jar with "KIMWIPE" alone hermetically placed therein was also measured as a control. The results are presented in Table 1. From the results of Table 1, it has become clear that the freshness-retaining agent according to the present invention is effective for lowering the concentration of ethylene in an atmosphere in which fresh apple exists. It has also become evident (from a comparison in the concentrations of ethylene on DAY 6) that the effect of the freshness-retaining agent according to the present invention lasts longer than that of the comparative product, the mixture of fumaric acid and sodium hydrogencarbonate.

TABLE 1

(Ethylene concentration lowering effect for apple)

| Freshness-retaining agent | Concentration of ethylene (ppm)* | | |
|---|---|---|---|
| | DAY 1 | DAY 2 | DAY 6 |
| Cinnamic acid | 100 | 100 | 100 |
| Cinnamic acid/sodium hydrogencarbonate | 75 | 50 | 75 |
| Ferulic acid/sodium hydrogencarbonate | 100 | 75 | 90 |
| Fumaric acid/sodium hydrogencarbonate | 75 | 75 | 125 |
| Control | 200 | 150 | 175 |

*Each ethylene concentration is an average obtained through an experiment conducted with n = 2 (n: sample size).

EXAMPLE 2

In 150-mL jars with 20 g per jar of fresh pieces of apple (variety: Mutsu) placed therein, mixtures (3 g) of cinnamic acid and sodium hydrogencarbonate (mixing ratios of which are described in Table 2) as freshness-retaining agents according to the present invention—all of which were individually wrapped with "KIMWIPE" (trademark for laboratory paper produced by Jujo-Kimberly Co., Ltd.)—were placed, respectively. Mouths of those jars were then hermetically closed with "PARAFILM". Those jars were left over at 23° C., and on DAY 1, DAY 3 and DAY 6, the concentrations of ethylene in the respective jars were measured by the tubular gas detector (manufactured by Gastec, Inc.). The concentration of ethylene in a jar with "KIMWIPE" alone hermetically placed therein was also measured as a control. The results are presented in Table 2. From the results of Table 2, it has become clear that the ethylene concentration lowering effect becomes most noticeable when the mixing ratio of cinnamic acid to sodium hydrogencarbonate is 1:0.2 to 1:0.5 (by weight).

TABLE 2

(Ethylene concentration lowering effect vs. mixing ratio)

| Freshness-retaining agent (g) | | Concentration of ethylene (ppm)* | | |
|---|---|---|---|---|
| Cinnamic acid | Sodium hydrogencarbonate | DAY 1 | DAY 3 | DAY 6 |
| 3.0 | 0 | 38 | 50 | 50 |
| 2.5 | 0.5 | 25 | ≦25 | 75 |
| 2.0 | 1.0 | 38 | ≦25 | 50 |
| 1.5 | 1.5 | 50 | 25 | 50 |
| 1.0 | 2.0 | 50 | 38 | 100 |
| 0.5 | 2.5 | 50 | 38 | 75 |
| 0 | 3.0 | 50 | 75 | 125 |

*Each ethylene concentration is an average obtained through an experiment conducted with n = 2 (n: sample size).

EXAMPLE 3

In 150-mL jars with 20 g per jar of fresh pieces of apple (variety: Mutsu) placed therein, portions (0.5 to 3 g) of a freshness-retaining agent [cinnamic acid:sodium hydrogencarbonate=1:2 (by weight)] according to the present invention—all of which were individually wrapped with "KIMWIPE" (trademark for laboratory paper produced by Jujo-Kimberly Co., Ltd.)—were placed, respectively. Mouths of those jars were then hermetically closed with "PARAFILM". Those jars were left over at 23° C., and on DAY 1 and DAY 3, the concentrations of ethylene in the respective jars were measured by the tubular gas detector (manufactured by Gastec, Inc.). The concentration of ethylene in a jar with "KIMWIPE" alone hermetically placed therein was also measured as a control. The results are presented in Table 3. From the results of Table 3, it has become clear that the freshness-retaining agent according to the present invention exhibits particularly marked ethylene concentration lowering effect when added in an amount of 1.5 g or greater per 20 g of fresh apple although the amount of the freshness-retaining agent, which is expected to bring about the ethylene concentration lowering effect, is 0.5 g or more.

TABLE 3

(Ethylene concentration lowering effect vs. added amount)

| Added amount of freshness-retaining agent (g) | Concentration of ethylene (ppm)* | |
|---|---|---|
| | DAY 1 | DAY 3 |
| 0.5 | 125 | 75 |
| 1.0 | 125 | 75 |
| 1.5 | 125 | 50 |
| 2.0 | 100 | 50 |
| 2.5 | 75 | 50 |
| 3.0 | 75 | 50 |
| Control | 125 | 150 |

*Each ethylene concentration is an average obtained through an experiment conducted with n = 2 (n: sample size).

EXAMPLE 4

In 150-mL jars with 20 g per jar of fresh pieces of apple (variety: Mutsu) placed therein, three freshness-retaining agents according to the present invention [1:3 (by molar ratio) mixtures of cinnamic acid and hydrogencarbonates]—all of which were individually wrapped with "KIMWIPE" (trademark for laboratory paper produced by Jujo-Kimberly Co., Ltd.)—were placed, respectively. Mouths of those jars were then hermetically closed with "PARAFILM". Those jars were left over at 23° C., and on DAY 1 and DAY 3, the concentrations of ethylene in the respective jars were measured by the tubular gas detector (manufactured by Gastec, Inc.). The concentration of ethylene in a jar with "KIMWIPE" alone hermetically placed therein was also measured as a control. The results are presented in Table 4. From the results of Table 4, it has become clear that the freshness-retaining agents according to the present invention—which make use of the three different hydrogencarbonate, respectively—are all effective for lowering the concentration of ethylene in an atmosphere in which fresh apple exists.

TABLE 4

(Ethylene concentration lowering effect for apple)

| Freshness-retaining agent (g) | Concentration of ethylene (ppm)* | |
|---|---|---|
| | DAY 1 | DAY 3 |
| Cinnamic acid/sodium hydrogencarbonate (1.0/1.7) | 125 | 75 |

TABLE 4-continued (Ethylene concentration lowering effect for apple)

| Freshness-retaining agent (g) | Concentration of ethylene (ppm)* | |
|---|---|---|
| | DAY 1 | DAY 3 |
| Cinnamic acid/ammonium hydrogencarbonate (1.0/1.6) | 125 | 25 |
| Cinnamic acid/potassium hydrogencarbonate (1.0/2.0) | 150 | 50 |
| Control | 150 | 125 |

*Each ethylene concentration is an average obtained through an experiment conducted with n = 2 (n: sample size).

EXAMPLE 5

In 150-mL jars with 20 g per jar of fresh pieces of apple (variety: Mutsu) placed therein, three freshness-retaining agents according to the present invention [each of which was a mixture of cinnamic acid or a derivative thereof (2 g) and sodium hydrogencarbonate (1 g)]—all of which were individually wrapped with "KIMWIPE" (trademark for laboratory paper produced by Jujo-Kimberly Co., Ltd.)—were placed, respectively. Mouths of those jars were then hermetically closed with "PARAFILM". Those jars were left over at 23° C., and on DAY 1 and DAY 3, the concentrations of ethylene in the respective jars were measured by the tubular gas detector (manufactured by Gastec, Inc.). The concentration of ethylene in a jar with "KIMWIPE" alone hermetically placed therein was also measured as a control. The results are presented in Table 5. From the results of Table 5, it has become clear that the three different freshness-retaining agents according to the present invention, each of which make use of cinnamic acid or a derivative thereof, are all effective for lowering the concentration of ethylene in an atmosphere in which fresh apple exists.

TABLE 5

(Ethylene concentration lowering effect for apple)

| Freshness-retaining agent | Concentration of ethylene (ppm)* | |
|---|---|---|
| | DAY 1 | DAY 3 |
| Caffeic acid/sodium hydrogencarbonate | 38 | 50 |
| p-Coumalic acid/sodium hydrogencarbonate | 50 | 50 |
| Cinnamic acid/sodium hydrogencarbonate | 50 | 25 |
| Control | 125 | 150 |

*Each ethylene concentration is an average obtained through an experiment conducted with n = 2 (n: sample size).

EXAMPLE 6

In 150-mL jars with 20 g per jar of fresh pieces of apple (variety: Mutsu) placed therein, three freshness-retaining agents according to the present invention [each of which was a mixture of benzoic acid and a hydrogencarbonate]—all of which were individually wrapped with "KIMWIPE" (trademark for laboratory paper produced by Jujo-Kimberly Co., Ltd.)—were placed in the amounts shown in Table 6, respectively. Mouths of those jars were then hermetically closed with "PARAFILM". Those jars were left over at 23° C., and on DAY 1 and DAY 3, the concentrations of ethylene in the respective jars were measured by the tubular gas detector (manufactured by Gastec, Inc.). The concentration of ethylene in a jar with "KIMWIPE" alone hermetically placed therein was also measured as a control. The results are presented in Table 6. From the results of Table 6, it has become clear that the freshness-retaining agents according to the present invention—which made use of the three different hydrogencarbonates, respectively—are all effective for lowering the concentration of ethylene in an atmosphere of fresh apple.

TABLE 6

(Ethylene concentration lowering effect for apple)

| Freshness-retaining agent (g) | Concentration of ethylene (ppm)* | |
|---|---|---|
| | DAY 1 | DAY 3 |
| Benzoic acid/sodium hydrogencarbonate (1.0/1.7) | 125 | 75 |
| Benzoic acid/ammonium hydrogencarbonate (1.0/1.9) | 125 | 25 |
| Benzoic acid/potassium hydrogencarbonate (1.0/2.5) | 150 | 50 |
| Control | 150 | 125 |

*Each ethylene concentration is an average obtained through an experiment conducted with n = 2 (n: sample size).

Example 7

In 150-mL jars with 20 g per jar of fresh pieces of apple (variety: Mutsu) placed therein, two freshness-retaining agents according to the present invention [each of which was a mixture of a benzoic acid derivative (2 g) and sodium hydrogencarbonate (1 g)]—all of which were individually wrapped with "KIMWIPE" (trademark for laboratory paper produced by Jujo-Kimberly Co., Ltd.)—were placed, respectively. Mouths of those jars were then hermetically closed with "PARAFILM". Those jars were left over at 23° C., and on DAY 1 and DAY 3, the concentrations of ethylene in the respective jars were measured by the tubular gas detector (manufactured by Gastec, Inc.). The concentration of ethylene in a jar with "KIMWIPE" alone hermetically placed therein was also measured as a control. The results are presented in Table 7. From the results of Table 7, it has become clear that the freshness-retaining agents according to the present invention—which make use of the two different benzoic acid derivatives, respectively—are all effective for lowering the concentration of ethylene in an atmosphere of fresh apple.

TABLE 7

(Ethylene concentration lowering effect for apple)

| Freshness-retaining agent | Concentration of ethylene (ppm)* | |
|---|---|---|
| | DAY 1 | DAY 3 |
| Vanillic acid/sodium hydrogencarbonate | 38 | 50 |
| Syringic acid/sodium hydrogencarbonate | 38 | 25 |
| Control | 125 | 150 |

*Each ethylene concentration is an average obtained through an experiment conducted with n = 2 (n: sample size).

EXAMPLE 8

In 150-mL jars with 20 g per jar of fresh pieces of apple (variety: Mutsu) placed therein, freshness-retaining agents according to the present invention [each of which was a mixture of an organic acid (2 g) and sodium hydrogencarbonate (1 g)]—all of which were individually wrapped with "KIMWIPE" (trademark for laboratory paper produced by Jujo-Kimberly Co., Ltd.)—were placed, respectively.

Mouths of those jars were then hermetically closed with "PARAFILM". Those jars were left over at 23° C., and on DAY 1, DAY 3 and DAY 7, the concentrations of ethylene in the respective jars were measured by the tubular gas detector (manufactured by Gastec, Inc.). The concentration of ethylene in a jar with "KIMWIPE" alone hermetically placed therein was also measured as a control. The results are presented in Table 8. From the results, it has become clear that the freshness-retaining agents according to the present invention are all effective for lowering the concentration of ethylene in an atmosphere in which fresh apple exists.

TABLE 8

(Ethylene concentration lowering effect for apple)

| | Concentration of ethylene (ppm)* | | |
|---|---|---|---|
| Freshness-retaining agent | DAY 1 | DAY 2 | DAY 7 |
| Sorbic acid/sodium hydrogencarbonate | 175 | 75 | 75 |
| Adipic acid/sodium hydrogencarbonate | 125 | 100 | 75 |
| Nicotinic acid/sodium hydrogencarbonate | 125 | 75 | 75 |
| Glutamic acid/sodium hydrogencarbonate | 125 | 75 | 75 |
| Itaconic acid/sodium hydrogencarbonate | 125 | 75 | 75 |
| Undecylenic acid/sodium hydrogencarbonate | 125 | 75 | 75 |
| Control | 275 | 175 | 150 |

*Each ethylene concentration is an average obtained through an experiment conducted with n = 2 (n: sample size).

EXAMPLE 9

In 150-mL jars with 20 g per jar of fresh pieces of apple (variety: Mutsu) placed therein, citric acid (3 g), monosodium citrate (3 g), disodium citrate (3 g) and sodium hydrogencarbonate (3 g) and, as freshness-retaining agents according to the present invention, mixtures of citric acid (1.5 g), monosodium carbonate (1.5 g) or disodium citrate (1.5 g) and sodium hydrogencarbonate (1.5 g)—all of which were individually wrapped with "KIMWIPE" (trademark for laboratory paper produced by Jujo-Kimberly Co., Ltd.)—were placed, respectively. Mouths of those jars were then hermetically closed with "PARAFILM". Those jars were left over at 23° C., and on DAY 1 and DAY 3, the concentrations of ethylene in the respective jars were measured by the tubular gas detector (manufactured by Gastec, Inc.). The concentration of ethylene in a jar with "KIMWIPE" alone hermetically placed therein was also measured as a control. The results are presented in Table 9. From the results, it has become clear that the freshness-retaining agents according to the present invention are effective for lowering the concentration of ethylene in an atmosphere in which fresh apple exists.

TABLE 9

(Ethylene concentration lowering effect for apple)

| | Concentration of ethylene (ppm)* | |
|---|---|---|
| Freshness-retaining agent | DAY 1 | DAY 3 |
| Citric acid | 275 | 125 |
| Monosodium citrate | 250 | 125 |
| Disodium citrate | 250 | 150 |
| Sodium hydrogencarbonate | 275 | 150 |

TABLE 9-continued (Ethylene concentration lowering effect for apple)

| | Concentration of ethylene (ppm)* | |
|---|---|---|
| Freshness-retaining agent | DAY 1 | DAY 3 |
| Citric acid/sodium hydrogencarbonate | 100 | 100 |
| Monosodium citrate/sodium hydrogencarbonate | 125 | 75 |
| Disodium citrate/sodium hydrogencarbonate | 150 | 100 |
| Control | 275 | 150 |

*Each ethylene concentration is an average obtained through an experiment conducted with n = 2 (n: sample size).

EXAMPLE 10

In 150-mL jars with 20 g per jar of fresh pieces of apple (variety: Mutsu) placed therein, mixtures (3 g) of monosodium citrate and sodium hydrogencarbonate (mixing ratios of which are described in Table 10) as freshness-retaining agents according to the present invention—all of which were individually wrapped with "KIMWIPE" (trademark for laboratory paper produced by Jujo-Kimberly Co., Ltd.)—were placed, respectively. Mouths of those jars were then hermetically closed with "PARAFILM". Those jars were left over at 23° C., and on DAY 1, DAY 3 and DAY 6, the concentrations of ethylene in the respective jars were measured by the tubular gas detector (manufactured by Gastec, Inc.). The results are presented in Table 10. From the results of Table 10, it has become clear that the ethylene concentration lowering effect becomes most noticeable when the mixing ratio of monosodium citrate to sodium hydrogencarbonate is 1:1 (by weight).

TABLE 10

(Ethylene concentration lowering effect vs. mixing ratio)

| Freshness-retaining agent (g) | | Concentration of ethylene (ppm)* | | |
|---|---|---|---|---|
| Monosodium citrate | Sodium hydrogencarbonate | DAY 1 | DAY 3 | DAY 6 |
| 2.0 | 1.0 | 125 | 100 | 100 |
| 1.5 | 1.5 | 125 | 75 | 75 |
| 1.0 | 2.0 | 150 | 125 | 125 |
| 0 | 3.0 | 275 | 150 | 150 |

*Each ethylene concentration is an average obtained through an experiment conducted with n = 2 (n: sample size).

EXAMPLE 11

In 150-mL jars with 20 g per jar of fresh pieces of apple (variety: Mutsu) placed therein, portions (0.5 to 5 g) of a freshness-retaining agent [monosodium citrate:sodium hyrogencarbonate=1:1 (by weight)] according to the present invention—all of which were individually wrapped with "KIMWIPE" (trademark for laboratory paper produced by Jujo-Kimberly Co., Ltd.)—were placed, respectively. Mouths of those jars were then hermetically closed with "PARAFILM". Those jars were left over at 23° C., and on DAY 1 and DAY 3, the concentrations of ethylene in the respective jars were measured by the tubular gas detector (manufactured by Gastec, Inc.). The concentration of ethylene in a jar with "KIMWIPE" alone hermetically placed therein was also measured as a control. The results are presented in Table 11. From the results of Table 11, it has become clear that the freshness-retaining agent according to the present invention exhibits particularly marked ethylene concentration lowering effect when added in an amount of 2.0 g or greater per 20 g of fresh apple although the amount of the freshness-retaining agent, which is expected to bring about the ethylene concentration lowering effect, is 0.5 g or more.

TABLE 11

(Ethylene concentration lowering effect vs. added amount)

| Added amount of freshness- | Concentration of ethylene (ppm)* | |
| --- | --- | --- |
| retaining agent (g) | DAY 1 | DAY 3 |
| 0.5 | 200 | 75 |
| 1.0 | 150 | 75 |
| 2.0 | 125 | 50 |
| 3.0 | 100 | 50 |
| 5.0 | 75 | 50 |
| Control | 250 | 150 |

*Each ethylene concentration is an average obtained through an experiment conducted with n = 2 (n: sample size).

EXAMPLE 12

In 150-mL jars with 20 g per jar of fresh pieces of apple (variety: Mutsu) placed therein, mixtures of powdery polyacrylic acid (PAA) and sodium hydrogencarbonate (SHC) (mixing ratios of which are described in Table 12)—all of which were individually wrapped with "KIMWIPE" (trademark for laboratory paper produced by Jujo-Kimberly Co., Ltd.)—were placed, respectively. Mouths of those jars were then hermetically closed with "PARAFILM". Those jars were left over at 23° C., and on DAY 1, DAY 3 and DAY 7, the concentrations of ethylene in the respective jars were measured by the tubular gas detector (manufactured by Gastec, Inc.). The concentration of ethylene in a jar with "KIMWIPE" alone hermetically placed therein was also measured as a control. The results are presented in Table 12. From the results, it has become clear that the freshness-retaining agents according to the present invention are effective for lowering the concentration of ethylene in an atmosphere in which fresh apple exists.

TABLE 12

(Ethylene concentration lowering effect for apple)

| | Concentration of ethylene (ppm)* | | |
| --- | --- | --- | --- |
| Freshness-retaining agent | DAY 1 | DAY 3 | DAY 7 |
| PAA/SHC (2 g/1 g) | 125 | 75 | 75 |
| PAA/SHC (1 g/2 g) | 125 | 75 | 75 |
| Control | 250 | 150 | 125 |

*Each ethylene concentration is an average obtained through an experiment conducted with n = 2 (n: sample size).
PAA: Polyacrylic acid
SHC: Sodium hydrogen carbonate

EXAMPLE 13

Ethylene concentration lowering effect of freshness-retaining agents for fresh apple was tested in a similar manner as in Example 12 except that polyacrylic acid was replaced by a 70:30 by weight mixture of methyl methacrylate and 2-methacryloyloxyethyl phosphate. Results substantially similar to those obtained in Example 12 were obtained.

What is claimed is:

1. A freshness-retaining agent for an agricultural or horticultural product, comprising an organic acid and a hydrogencarbonate, wherein the organic acid is selected from the group consisting of cinnamic acid, derivatives of cinnamic acid, benzoic acid, vanillic acid, syringic acid, salicylic acid, sorbic acid, glutamic acid, nicotinic acid, undecylenic acid, itaconic acid, and polymers having acidic groups.

2. A freshness-retaining agent according to claim 1, wherein said organic acid and said hydrogencarbonate are mixed at a ratio of 1:0.1 to 1:5 by weight.

3. A freshness-retaining agent according to claim 1, wherein said hydrogencarbonate is sodium hydrogencarbonate.

4. A freshness-retaining agent according to claim 1, wherein said organic acid is cinnamic acid or a derivative thereof.

5. A freshness-retaining agent according to claim 1, wherein said organic acid is at least one derivative of cinnamic acid, which is selected from the group consisting of p-coumalic acid, caffeic acid and ferulic acid.

6. A freshness-retaining agent according to claim 1, wherein said organic acid is benzoic acid.

7. A freshness-retaining agent according to claim 1, wherein said organic acid is at least one organic acid selected from the group consisting of vanillic acid, syringic acid and salicylic acid.

8. A freshness-retaining agent according to claim 1, wherein said organic acid is at least one organic acid selected from the group consisting of sorbic acid, glutamic acid, nicotinic acid, undecylenic acid, and itaconic acid.

9. A freshness-retaining agent according to claim 1, wherein said organic acid is a polymer having acidic groups.

10. A freshness-retaining agent according to claim 9, wherein said acidic groups are selected from carboxyl groups, sulfonic groups, sulfate ester groups or phosphate ester groups.

11. A freshness-retaining method for an agricultural or horticultural product, which comprises causing a freshness-retaining agent according to any one of claims 1, 2–8, 9 and 10, to exist in the same atmosphere as said agricultural or horticultural product such that said freshness-retaining agent is allowed to gradually generate carbon dioxide gas in the presence of water given off from said agricultural or horticultural product.

12. A freshness-retaining method according to claim 11, wherein said freshness-retaining agent is used in a proportion of from 0.1 to 20 parts by weight per 100 parts by weight of said agricultural or horticultural product.

* * * * *